(12) United States Patent
Choi

(10) Patent No.: US 12,524,199 B2
(45) Date of Patent: Jan. 13, 2026

(54) DISPLAY DEVICE

(71) Applicant: LG ELECTRONICS INC., Seoul (KR)

(72) Inventor: Woojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 18/291,183

(22) PCT Filed: Jul. 23, 2021

(86) PCT No.: PCT/KR2021/009581
§ 371 (c)(1),
(2) Date: Jan. 22, 2024

(87) PCT Pub. No.: WO2023/003061
PCT Pub. Date: Jan. 26, 2023

(65) Prior Publication Data
US 2024/0373080 A1 Nov. 7, 2024

(51) Int. Cl.
*G06F 3/16* (2006.01)
*G06V 10/56* (2022.01)
(Continued)

(52) U.S. Cl.
CPC .............. *G06F 3/167* (2013.01); *G06V 10/56* (2022.01); *G06V 10/82* (2022.01);
(Continued)

(58) Field of Classification Search
CPC ........ G06F 3/167; G06V 10/56; G06V 10/82; G06V 2201/02; G06V 20/46;
(Continued)

(56) References Cited

U.S. PATENT DOCUMENTS 9,277,267 B2 * 3/2016 Matsuda .............. H04N 21/482
10,353,564 B2 * 7/2019 Voutta ................. G06F 3/04883
(Continued)

FOREIGN PATENT DOCUMENTS

CN 109218526 B * 9/2020 ........ H04M 1/72436
CN 120144797 A * 6/2025
(Continued)

OTHER PUBLICATIONS

PCT International Application No. PCT/KR2021/009581, International Search Report dated Apr. 20, 2022, 2 pages.

*Primary Examiner* — Laurie A Ries
(74) *Attorney, Agent, or Firm* — LEE, HONG, DEGERMAN, KANG & WAIMEY

(57) ABSTRACT

The present disclosure discloses a display device comprising: a communication unit; a display unit; a microphone; and a control unit which acquires screen image data by capturing a content provider screen including at least one piece of content outputted through the display unit upon receiving a wake-up word, inputs the screen image data to a screen recognition model corresponding to the content provider to detect at least one content region, outputs a labeling icon corresponding to each content region by using coordinate information of the content region corresponding to each of the at least one content regions detected by the screen recognition model, and when a user utterance corresponding to any one of the labeling icons is received, executes the content corresponding to the labeling icon.

16 Claims, 11 Drawing Sheets

(51) Int. Cl.
*G06V 10/82* (2022.01)
*H04N 21/422* (2011.01)
*H04N 21/431* (2011.01)
*H04N 21/472* (2011.01)
*H04N 21/482* (2011.01)

(52) U.S. Cl.
CPC ... *H04N 21/42203* (2013.01); *H04N 21/4312* (2013.01); *H04N 21/472* (2013.01); *H04N 21/482* (2013.01)

(58) Field of Classification Search
CPC ......... H04N 21/42203; H04N 21/4312; H04N 21/472; H04N 21/482; H04N 21/44008; H04N 21/431; H04N 21/4728
See application file for complete search history.

(56) References Cited

U.S. PATENT DOCUMENTS

| | | | | |
|---|---|---|---|---|
| 12,380,340 | B1* | 8/2025 | Mamut | G06N 5/022 |
| 12,400,750 | B1* | 8/2025 | Jin | G16H 30/40 |
| 2013/0176244 | A1* | 7/2013 | Yamamoto | H04N 21/4826 |
| | | | | 345/173 |
| 2016/0182577 | A1* | 6/2016 | Lipman | H04L 51/046 |
| | | | | 715/753 |
| 2017/0324794 | A1 | 11/2017 | Jeong et al. | |
| 2018/0114326 | A1 | 4/2018 | Roblek et al. | |
| 2018/0335908 | A1* | 11/2018 | Kim | G06Q 50/10 |
| 2019/0050666 | A1 | 2/2019 | Kim et al. | |
| 2019/0371320 | A1 | 12/2019 | Netzer | |
| 2021/0117152 | A1* | 4/2021 | Deisher | G06N 3/08 |
| 2025/0265523 | A1* | 8/2025 | Watanabe | G06Q 10/06316 |

FOREIGN PATENT DOCUMENTS

| | | | | |
|---|---|---|---|---|
| CN | 120375383 | A | * 7/2025 | |
| KR | 1020160091628 | | 8/2016 | |
| KR | 1020170101076 | | 9/2017 | |
| KR | 20180135074 | A | * 12/2018 | ............... G06T 7/11 |
| KR | 1020180135074 | | 12/2018 | |
| KR | 102005034 | | 7/2019 | |

* cited by examiner

DISPLAY DEVICE

CROSS-REFERENCE TO RELATED APPLICATION(S)

This application is the National Stage filing under 35 U.S.C. 371 of International Application No. PCT/KR2021/009581, filed on Jul. 23, 2021, the contents of which are all incorporated by reference herein in its entirety.

TECHNICAL FIELD

The present disclosure relates to a display device for executing content provided by a content provider.

BACKGROUND ART

The display device is a device having a function of receiving, processing, and displaying an image that can be viewed by a user. For example, the display device receives a broadcast signal selected by a user from among broadcast signals transmitted from a broadcasting station, separates an image signal from the received signal, and displays the separated image signal on the display.

Recently, a display device frequently generates and outputs image data from a content provider, and functions tailored to user convenience such as selecting various contents by using a voice recognition function provided in the display device itself have been developed.

Since a function for directly selecting content within a screen provided by a content provider is not provided in an operation for selecting a specific content after entering a content provider such as YouTube, Netflix, Wavve by long-distance speech recognition, there is a limitation in actual use.

For example, when a user enters a screen provided by a content provider by using voice recognition, a function of moving a cursor in four directions such as right, left, bottom, up, and the like is possible, and in order to select content, a remote control device should be used after long-distance speech recognition.

DISCLOSURE

Technical Problem

An object of the present disclosure is to directly select image content within a content provider using voice recognition through screen recognition.

An object of the present disclosure is to accurately recognize an area of screen image data, in which content is present, using screen recognition.

An object of the present disclosure is to provide convenience for content selection of a user by applying labeling corresponding to at least one content using screen recognition.

Technical Solution

In an aspect of the present disclosure, a display device includes a display unit configured to output a screen provided by a content provider, a microphone, and a controller configured to obtain screen image data by capturing a content provider screen including at least one content output through the display unit upon receiving a wake-up word, detect at least one content area by inputting the screen image data to a screen recognition model corresponding to the content provider, output a labelling icon corresponding to each of the at least one content area using coordinate information corresponding to each of the at least one content area detected by the screen recognition model, and execute content corresponding to the labelling icon upon receiving user utterance corresponding to any one of the labelling icon.

The coordinate information of the content area may include a content click coordinate and a content labelling coordinate.

The content click coordinate may be a center coordinate, and the content labelling coordinate may be an upper left coordinate of the content area.

Based on the screen image data being input, the screen recognition model may list up a contour candidate of the screen image data, aggregate the candidates to detect a content area, and detect a content area based on the detected region.

The controller may separate the screen image data into R, G, and B channels and inputs each of separated channel images to the screen recognition model, and the screen recognition model may detect the content area of each of the R, G, and B channels, and aggregate content areas detected for the respective channels to detect the content area.

The screen recognition model may include an artificial neural network, and based on the screen image data being input, the screen recognition model may be learned to output the coordinate information of the content area located in the screen.

The screen recognition model may include a first screen recognition model and a second screen recognition model, based on the screen image data being input, the first screen recognition model may lists up a contour candidate of the screen image data and aggregate the candidates to detect a first content area, the second screen recognition model may include an artificial neural network, and based on the screen image data being input, the screen recognition model may detect a second content area located in the screen, and the controller may aggregate the first content area and the second content area to detect a content area.

The labelling icon may include at least one of object information displayed in the content area, text information displayed around the content area, and placement information.

In another aspect of the present disclosure, a method of operating a display device includes obtaining screen image data by capturing a content provider screen including at least one content output through a display unit upon receiving a wake-up word, inputting the screen image data to a screen recognition model corresponding to the content provider, detecting at least one content area using the screen recognition model, obtaining coordinate information of a content area of the detected content area, outputting a labelling icon corresponding to each of the at least one content area using the coordinate information of the content area corresponding to each of the at least one content area detected by the screen recognition model, and upon receiving user utterance corresponding to any one of the labelling icon, executing content corresponding to the labelling icon.

The detecting of the at least one content area using the screen recognition model may include, based on the screen image data being input, listing up a contour candidate of the screen image data, aggregating the candidates to detect a content area, and detecting a content area based on the detected region, by the screen recognition model.

The detecting of the at least one content area using the screen recognition model may include separating the screen image data into R, G, and B channels and inputting each of separated channel images to the screen recognition model, and detecting the content area of each of the R, G, and B channels, and aggregating content areas detected for the respective channels to detect the content area. The detecting of the at least one content area using the screen recognition model may include, based on the screen image data being input, listing up a contour candidate of the screen image data and aggregating the candidates to detect a first content area, by the first screen recognition model, based on the screen image data being input, the screen recognition model detects a second content area located in the screen, the second screen recognition model including an artificial neural network, and aggregating the content area and the content area to detect a content area.

Advantageous Effects

According to an embodiment of the present disclosure, a content area provided by a content provider may be recognized through screen recognition, and content in which a content area is present may be selected and reproduced through long-distance voice recognition, thereby providing convenience to a user.

According to an embodiment of the present disclosure, an area of screen image data, in which content is present, may be accurately recognized using screen recognition, and thus the corresponding content may be accurately selected and reproduced when a click command according to user utterance is executed.

According to an embodiment of the present disclosure, a guide according to a voice command to be uttered by a user for content selection may be provided by giving labeling corresponding to at least one content using screen recognition

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

Figure 1:
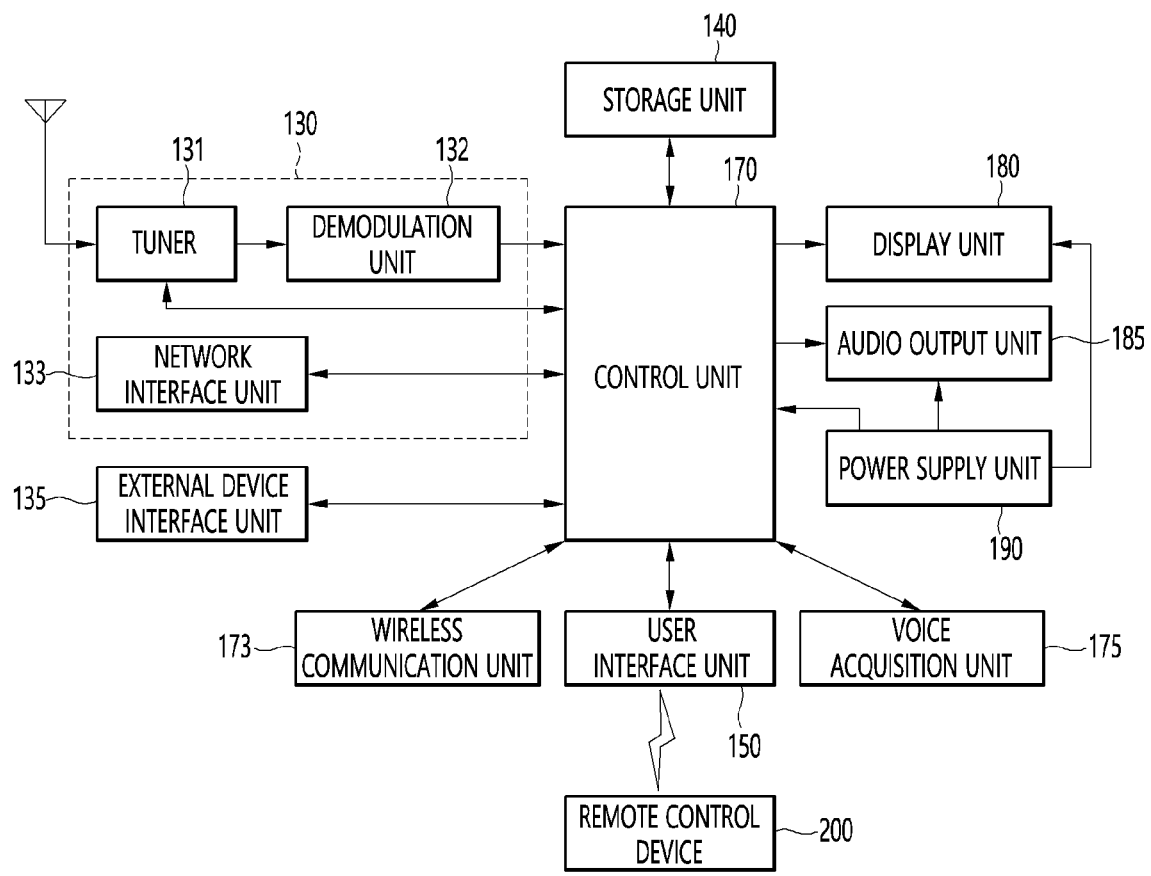
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception unit 130, an external device interface unit 135, a storage unit 140, a user interface unit 150, a controller 170, a wireless communication unit 173, voice acquisition unit 175, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

Then, the network interface unit 133 may receive contents or data provided from a content provider or a network operator. That is, the network interface unit 133 may receive contents such as movies, advertisements, games, VODs, and broadcast signals, which are provided from a content provider or a network provider, through network and information relating thereto.

Additionally, the network interface unit 133 may receive firmware update information and update files provided from a network operator and transmit data to an Internet or content provider or a network operator.

The network interface unit 133 may select and receive a desired application among applications open to the air, through network.

The external device interface unit 135 may receive an application or an application list in an adjacent external device and deliver it to the controller 170 or the storage unit 140.

The external device interface unit 135 may provide a connection path between the display device 100 and an external device. The external device interface unit 135 may receive at least one an image or audio output from an external device that is wirelessly or wiredly connected to the display device 100 and deliver it to the controller 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB Memory, and a home theater system, but this is just exemplary.

Additionally, some of the content data stored in the display device 100 may be transmitted to a selected user or selected electronic device among other users or other electronic devices pre-registered in the display device 100.

The storage unit 140 may store signal-processed image, voice, or data signals stored by a program in order for each signal processing and control in the controller 170.

Additionally, the storage unit 140 may perform a function for temporarily storing image, voice, or data signals output from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (for example, video files, still image files, music files, document files, application files, and so on) stored in the storage unit 140 and provide them to a user.

The user interface unit 150 may deliver signals input by a user to the controller 170 or deliver signals from the controller 170 to a user. For example, the user interface unit 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

The user interface unit 150 may deliver, to the controller 170, control signals input from local keys (not shown) such as a power key, a channel key, a volume key, and a setting key.

Image signals that are image-processed in the controller 170 may be input to the display unit 180 and displayed as an image corresponding to corresponding image signals. Additionally, image signals that are image-processed in the controller 170 may be input to an external output device through the external device interface unit 135.

Voice signals processed in the controller 170 may be output to the audio output unit 185. Additionally, voice signals processed in the controller 170 may be input to an external output device through the external device interface unit 135.

Besides that, the controller 170 may control overall operations in the display device 100.

The controller 170 may control the display device 100 by a user command or internal program input through the user interface unit 150 and download a desired application or application list into the display device 100 in access to network.

The controller 170 may output channel information selected by a user together with processed image or voice signals through the display unit 180 or the audio output unit 185.

Additionally, according to an external device image playback command received through the user interface unit 150, the controller 170 may output image signals or voice signals of an external device such as a camera or a camcorder, which are input through the external device interface unit 135, through the display unit 180 or the audio output unit 185.

Moreover, the controller 170 may control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform a wired or wireless communication with an external electronic device. The wireless communication unit 173 may perform short-range communication with an external device. For this, the wireless communication unit 173 may support short-range communication by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a communicable wearable device around the display device 100. Furthermore, if the detected wearable device is a device authenticated to communicate with the display device 100, the controller 170 may transmit at least part of data processed in the display device 100 to the wearable device through the wireless communication unit 173. Accordingly, a user of the wearable device may use the data processed in the display device 100 through the wearable device.

The voice acquisition unit 175 may acquire audio. The voice acquisition unit 175 may include at least one microphone (not shown) and acquire audio of adjacent of the display device 100 through a microphone (not shown)

The display unit 180 may convert image signal, data signal, or on-screen display (OSD) signal, which are processed in the controller 170, or images signal or data signal, which are received in the external device interface unit 135, into R, G, and B signals to generate driving signal.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing contents input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the controller 170 and outputs it as audio.

The power supply unit 190 supplies the corresponding power throughout the display device 100. In particular, power may be supplied to the controller 170, which can be implemented in the form of a system on chip (SOC), the display unit 180 for displaying images, and the audio output unit 185 for audio output.

Specifically, the power supply unit 190 may include a converter that converts alternating current power to direct current power and a dc/dc converter that converts the level of direct current power.

Figure 2:
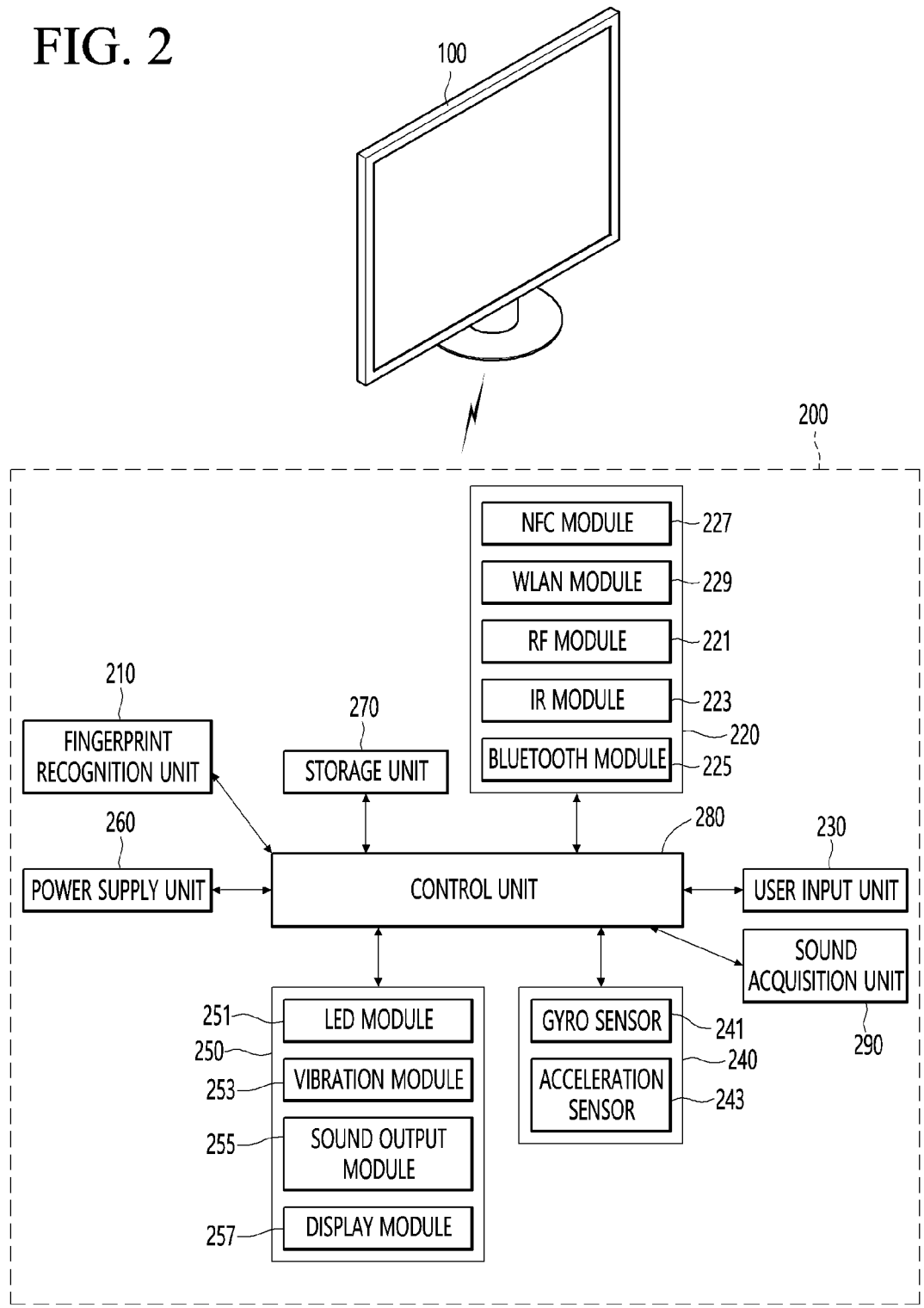
FIG. 2 is a block diagram illustrating a remote control device according to an embodiment of the present disclosure.
Figure 3:
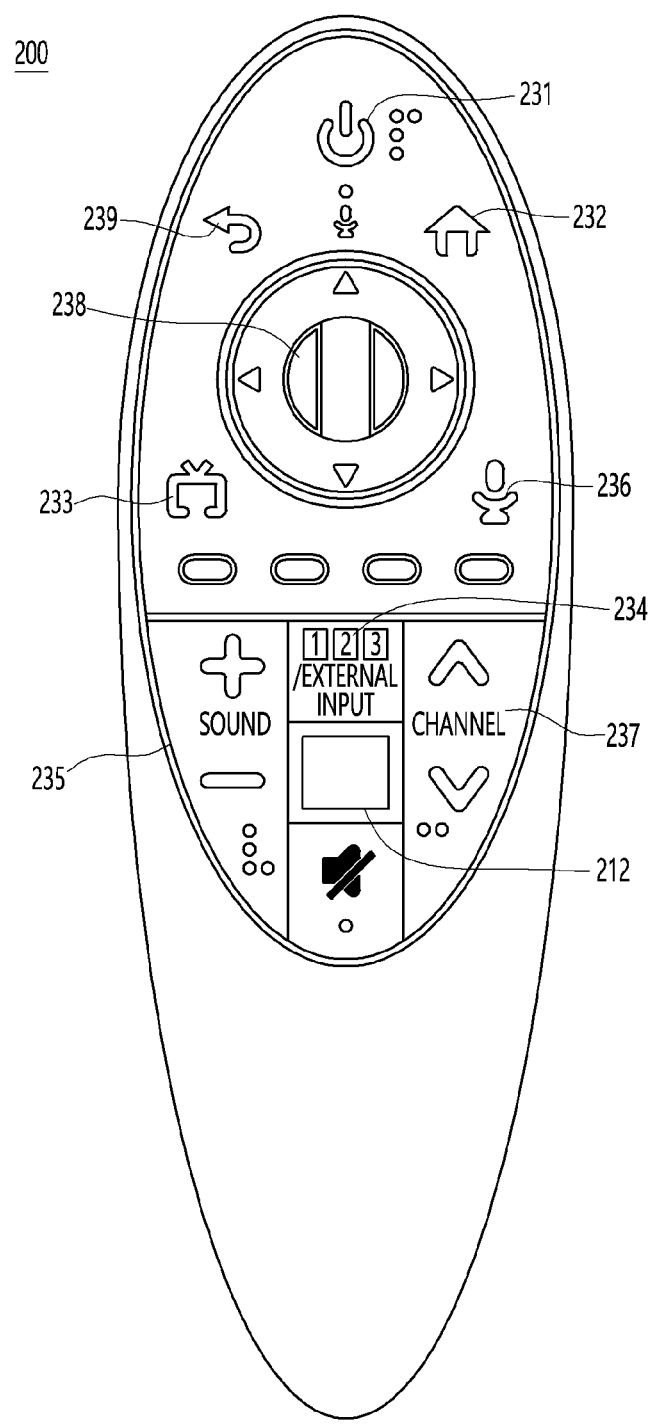
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a controller 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 may include a Bluetooth module 225 for transmitting/receiving signals to/from the display device 100 according to the Bluetooth communication standards. Additionally, the remote control device 200 may include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 may transmit signals containing information on a movement of the remote control device 200 to the display device 100 through the wireless communication unit 220.

Moreover, the remote control device 200 may receive signals transmitted from the display device 100 through the RF module 221 and if necessary, may transmit a command on power on/off, channel change, and volume change to the display device 100 through the IR module 223.

The user input unit 230 may be configured with a keypad button, a touch pad, or a touch screen. A user may manipulate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The voice adjustment button 235 may be a button for adjusting the size of a volume output from the display device 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Again, FIG. 2 will be described.

If the user input unit 230 includes a touch screen, a user may touch a soft key of the touch screen to input a command relating to the display device 100 to the remote control device 200. Additionally, the user input unit 230 may include various kinds of input means manipulated by a user, for example, a scroll key and a jog key, and this embodiment does not limit the scope of the present disclosure.

The sensor unit 240 may include a gyro sensor 241 or an acceleration sensor 243 and the gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display unit 180 of the display device 100.

The output unit 250 may output image or voice signals in response to manipulation of the user input unit 230 or image or voice signals corresponding to signals transmitted from the display device 100. A user may recognize whether the user input unit 230 is manipulated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the power supply if a predetermined key provided at the remote control device 200 is manipulated.

The storage unit 270 may store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 may store, in the storage unit 270, information on a frequency band for transmitting/receiving signals to/from the display device 100 paired with the remote control device 200 and refer to it.

The controller 280 controls general matters relating to control of the remote control device 200. The controller 280 may transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 may obtain voice.

The sound acquisition unit 290 may include at least one microphone and obtain voice through the microphone 291.

Next, FIG. 4 will be described.

Figure 4:
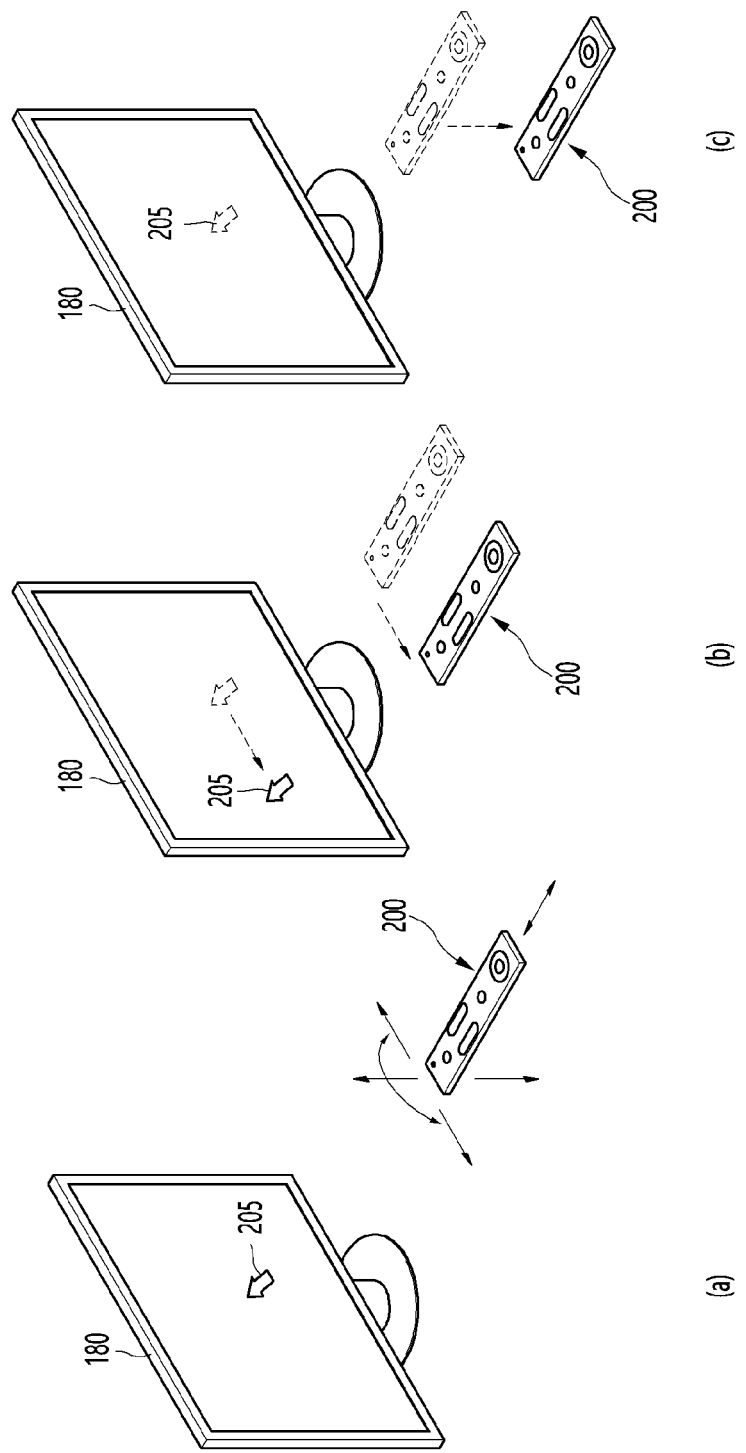
FIG. 4 is a view of utilizing a remote control device according to an embodiment of the present disclosure.

FIG. 4 is a view of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 may be zoomed in and displayed larger.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Figure 5:
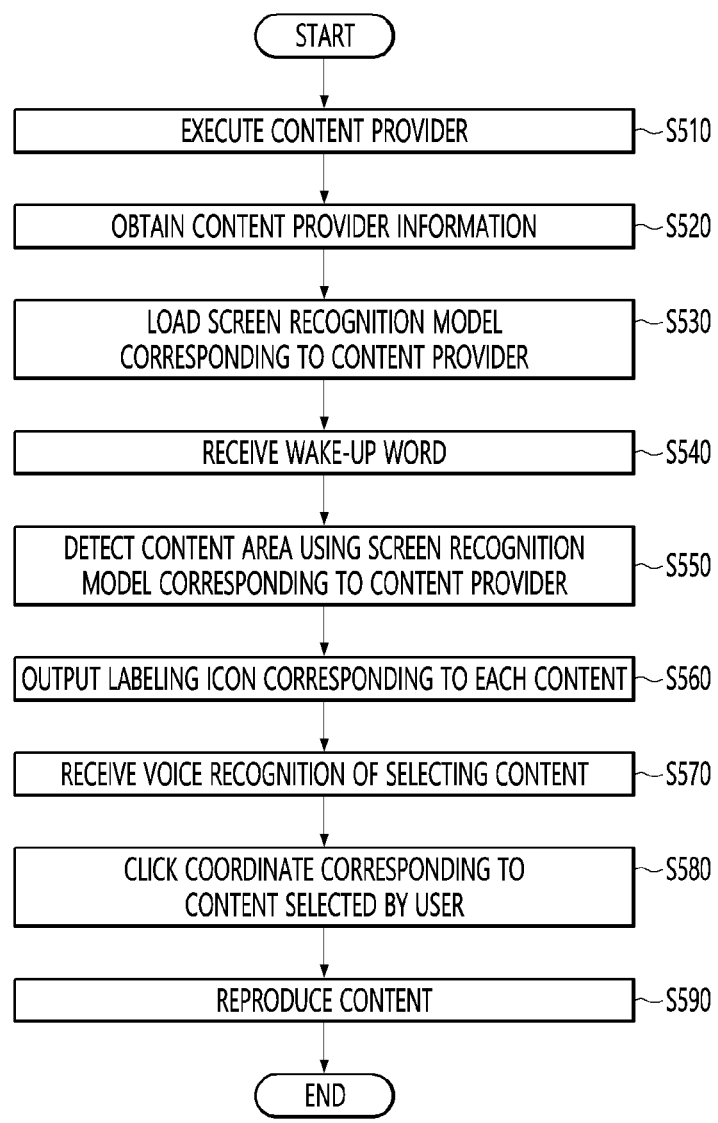
FIG. 5 is a flowchart according to an embodiment of the present disclosure.

FIG. 5 is a flowchart according to an embodiment of the present disclosure.

Referring to FIG. 5, a user may execute an application providing various content image data and sound data (S510). Hereinafter, the application is used interchangeably with a content provider.

In this case, the content provider may be understood as a concept including various devices and servers for providing various images and sound data by communicating with the display device as well as an external input device for providing an external input source. For example, the content provider may be understood as a concept including various contents for providing content such as YouTube, INSTAGRAM, and other WEBs.

The display unit 180 of the display device 100 may output a screen provided by the content provider. Here, the screen provided by the content provider may include at least one content and text including information about at least one content.

The user may instruct the screen provided by the content provider to reproduce the content through the user input. In this case, the user may transmit an intention to input a user command through voice recognition through a wake-up word.

The display device 100 may receive the wake-up word and perform an operation corresponding to a user command to be received after receiving the wake-up word.

In the related art, when a command for manipulating a cursor output to the display device or reproducing specific content with respect to a specific voice command is input after a user utters the wake-up word, the display device or the remote control device may move a cursor, which is currently output on the screen, in a specific direction or perform a click command, an operation corresponding to a voice recognition command is performed according to a key cord indicating manipulation of a direction key, and thus there is a problem in that the operation is not smooth, and the user is not capable of accurately executing content desired by the user, and thus the user has a difficulty in actually using the content.

Therefore, there is a need for a method for directly selecting an image in the screen provided by the content provider using voice recognition.

The controller 170 according to an embodiment of the present disclosure may obtain information on the content provider that is currently executed. In detail, when an application corresponding to the content provider is executed, the controller 170 may obtain information of the content provider (application) currently executed in a foreground by using an operating system provided in the display device.

The controller 170 may recognize a type of the content provider currently executed using the information of the content provider.

The controller 170 according to an embodiment of the present disclosure may load a screen recognition model optimized for screen recognition provided from the content provider (S530).

In this case, the screen recognition model may be a model that is fitted based on a type of the content provider and detects an object, a contour, a text, and a content area on a screen provided by the content provider to output coordinate information of an area in which the content is located. An example related thereto will be described below.

The controller 170 according to an embodiment of the present disclosure may receive utterance of the wake-up word from the user (S540). In this case, the wake-up word may be obtained from the input unit 150 or the voice acquisition unit 175, and the input unit 150 or the voice acquisition unit 175 may include a microphone.

When the controller 170 receives the wake-up word which is a trigger of voice recognition activation from the user, the controller 170 may perform image processing using a screen recognition model or a screen recognition algorithm of the currently executed content provider to detect the content area (S550).

The controller 170 may output a labeling icon corresponding to each content output on the screen through the display unit (S560).

Specifically, an image processing method according to an embodiment of the present disclosure will be described with reference to FIG. 6.

Figure 6:
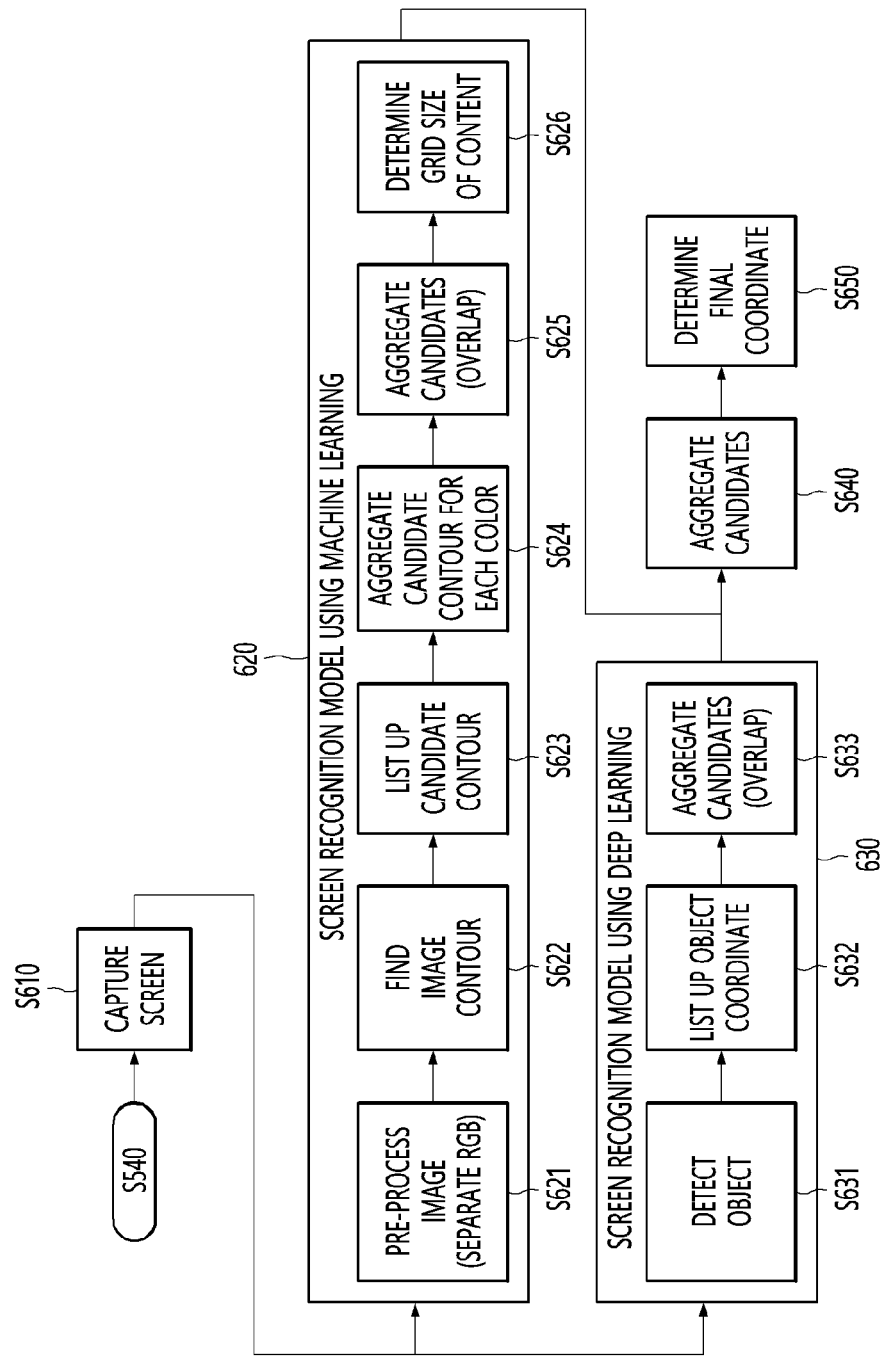
FIG. 6 illustrates an operation of a screen recognition model according to an embodiment of the present disclosure.

FIG. 6 illustrates an operation of a screen recognition model according to an embodiment of the present disclosure.

Referring to FIG. 6, the controller 170 according to an embodiment of the present disclosure may receive utterance of the wake-up word from the user. Thereafter, the controller 170 may capture a screen provided by a content provider output through the display unit 180.

The controller 170 may obtain the screen image data captured by the content provider (S610).

Specifically, when the wake-up word is received, the controller 170 may capture a screen currently output through the display unit and collect screen image data.

The controller 170 may perform image processing using the obtained screen image data, detect a location at which the content is positioned in the screen image data, and detect a content area based on the location. The coordinate information of the content area may be obtained by detecting the content area.

Specifically, the controller 170 according to an embodiment of the present disclosure may detect a content position by using a screen recognition model 620 using machine learning of Rule-Base and obtain coordinate information of the content area.

The controller 170 according to an embodiment of the present disclosure may detect the content position by using the deep learning-based screen recognition model 630 using a neural network and obtain coordinate information of the content area.

The controller 170 according to an embodiment of the present disclosure may detect the content position and obtain coordinate information of the content area by using (3) a hybrid screen recognition model in which the methods of (1) and (2) are combined.

Referring to screen arrangement provided by the content provider to the display device 100, a grid arrangement in which content, text, and various menus are arranged at a predetermined location may be generally used, and thus a screen recognition model suitable for the content provider may be used.

That is, the controller 170 may load and use a screen recognition model corresponding to a type of the content provider, and the screen recognition model may be optimized in the grid arrangement in which content, text, and various menus of a corresponding content provider are arranged at a predetermined location, thereby detecting the location of the content area.

Hereinafter, a screen recognition model of (1) to (3) will be described.

First, (1) the screen recognition model 620 using machine learning is described.

According to an embodiment of the present disclosure, the controller 170 may input the screen image data to the screen recognition model 620 using machine learning.

In this case, the screen recognition model 620 using machine learning may be operated as follows.

In describing an operation principle of the screen recognition model using machine learning according to an embodiment of the present disclosure, when image data is input, a contour of the input image is detected, and a content area, which is an area in which the content is located, is detected by using the contour information.

That is, in consideration of the grid arrangement, a box area in which the content is located may be found.

In this case, contour detection may mean finding a line connecting boundary lines with colors of the same intensity in the image. In other words, contour detection is used as a method to find images with the same intensity.

Specifically, the screen recognition model 620 using machine learning may separate screen image data into R, G, and B channels by using screen image data (S621). The controller may change the image of each of the separated R, G, and B channels into a binary image to detect a boundary line of the content (S622).

Hereinafter, the process will be described with reference to FIG. 7.

Figure 7:
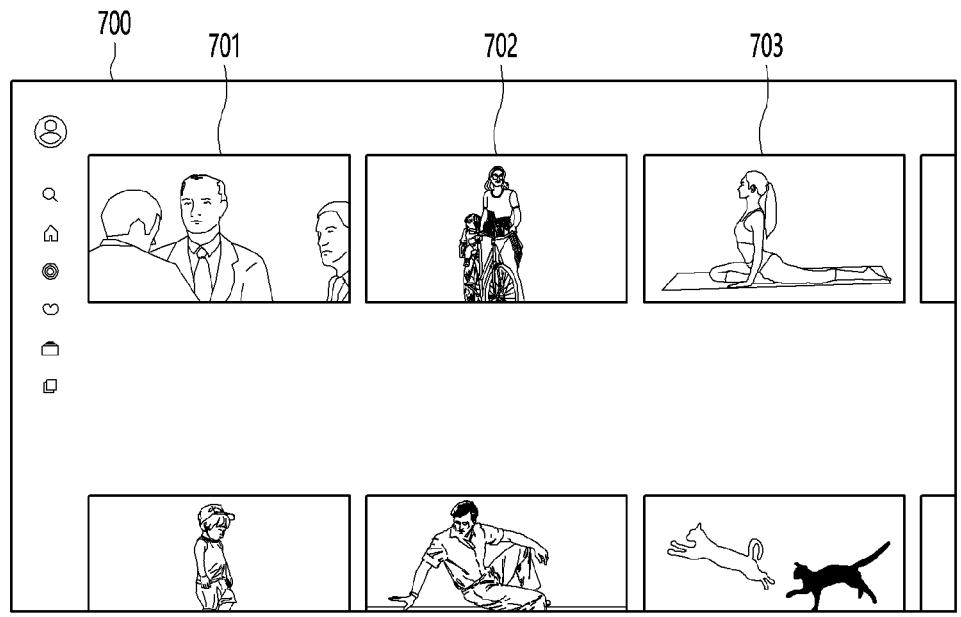
FIG. 7 illustrates an example of content area detection according to an embodiment of the present disclosure.

FIG. 7 is a diagram illustrating a screen extracted according to a contour detection algorithm of screen image data from the screen image data.

Referring to FIG. 7, the screen image data may include at least one content, text, and a menu. The content, the text, and the menu may be differently set for each content provider.

The controller 170 may perform image preprocessing through a screen recognition model. Specifically, the contour of each grid varies, and thus the screen image data may be divided into R, G, and B channels and calculated.

Thereafter, the contour of the image may be detected by using a contour algorithm to detect each of the R, G, and B channels. For example, the controller 170 may find a grid in a manner of finding and connecting portions in which color changes.

The controller 170 may list up a boundary line candidate of the extracted content (S623, refer to FIG. 6), select a candidate contour for each channel, and perform contour aggregation (S624, refer to FIG. 6).

According to the contour aggregation, the controller 170 may detect the contour of the at least one content 701, 702, and 703.

Hereinafter, an aggregation method will be described with reference to FIG. 8.

Figure 8:
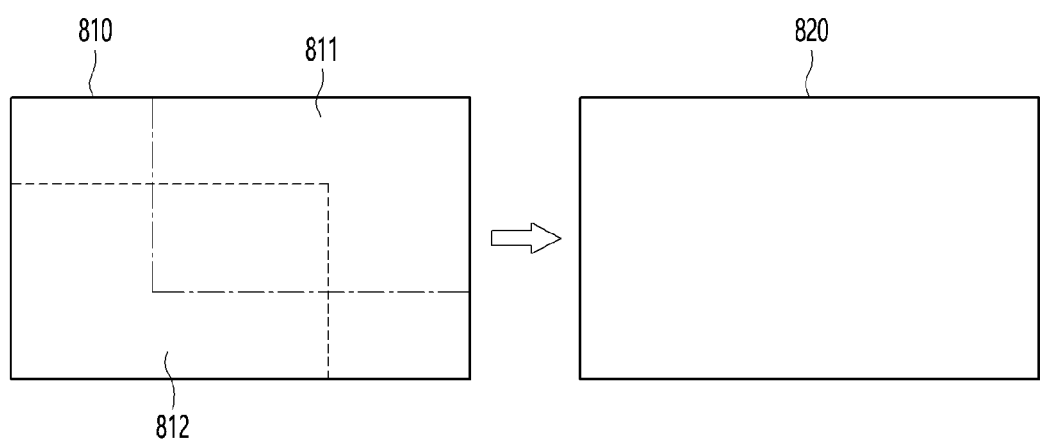
FIG. 8 illustrates a contour aggregation method according to an embodiment of the present disclosure.

FIG. 8 is a diagram illustrating a contour aggregation method according to an embodiment of the present disclosure.

Referring to FIG. 8, the controller may list boundary candidate lists 811 and 812 for a specific content 810 included in screen image data.

This shows an example of a predetermined contour among contours that are most likely to be a contour for the corresponding content as a result of an operation of the screen recognition model.

The controller 170 may detect the candidate content area 820 by aggregating the boundary candidate lists 811 and 812 through various methods such as image aggregation and image movement.

For example, the controller 170 may generate a virtual line extending an outline of the boundary candidate list 811 or 812, and generate the candidate content area 820 by using a point at which virtual lines of the boundary candidate lists meet.

The candidate content area 820 may be detected for each of the R, G, and B channels, and the controller may aggregate the candidate content areas for the respective channels.

For example, the aggregation method of the candidate content areas for respective channels may generate one candidate by combining overlapping or included regions, and outlines of the candidate content area 820 of each channel may be a boundary candidate list of a final content boundary area to generate a final content boundary region in the method shown in FIG. 8.

The controller finally may finally aggregate candidate contours aggregated for respective R, G, and B channels (S625) to select the size of a grid area in which contents are positioned.

That is, the controller 170 may input the screen image data to the screen recognition model 620 using machine learning to extract an outer outline of an area in which content is positioned, generate contours, and detect a content area using the generated contour lines. Coordinates of the content area in which the content area is located may also be obtained on the screen of the display device 100.

The screen recognition model using machine learning has a higher speed than the screen recognition model using the neural network to be described below but is Rule-based, and thus a type of the content provider may be changed or when a UE is changed, it may be difficult to respond to the change.

To compensate for this, (2) the screen recognition model 630 using deep learning is disclosed.

The controller 170 according to an embodiment of the present disclosure may generate an artificial intelligence model corresponding to a plurality of content providers by using an object detection algorithm for finding several objects in one image, and may detect a content area of the screen image data by using a screen recognition model adaptive to various content providers.

Referring back to FIG. 6, an operation method of the screen recognition model 630 using deep learning will be described.

The controller 170 may obtain information of the content provider in a foreground, and when the wake-up word is received, the controller 170 may capture a screen output through the display unit (S610).

The captured screen may be collectively referred to as screen image data as described above.

The controller 170 may pre-process the screen image data and detect an object included in the image data by using the artificial neural network model (S631).

In this case, the artificial neural network model may be a model that is overfitted to grid information, content arrangement information, and a text arrangement degree of the content provider that is currently executed.

The controller 170 may list up the coordinate data of the object by using the artificial neural network model (S632). The list-up coordinate data may be coordinate data such as arrangement of content included in the screen image data, or a bounding box for the detected object.

The controller 170 may aggregate candidates corresponding to a content area using the list-up coordinate data (S633), and detect a final content area.

When image data is input, the artificial neural network model according to an embodiment of the present disclosure may be trained by labeling, as a result value, coordinate data of a content area corresponding to a content provider as a correct answer value.

Specifically, the artificial neural network model may allow a user to input coordinate information corresponding to each of the content, the text, and the menu included in the image content. In the present disclosure, the artificial neural network model requires coordinate data of the content area, and thus it may be possible to learn to output coordinate data of the content area.

A convolutional neural network (CNN) that is commonly used may be used as the artificial neural network model.

When screen image data is input, the trained artificial neural network model may list up and output a coordinate list of the detected object.

The screen recognition model according to an embodiment of the present disclosure may detect a content area by aggregating the coordinate list of objects.

Figure 9:
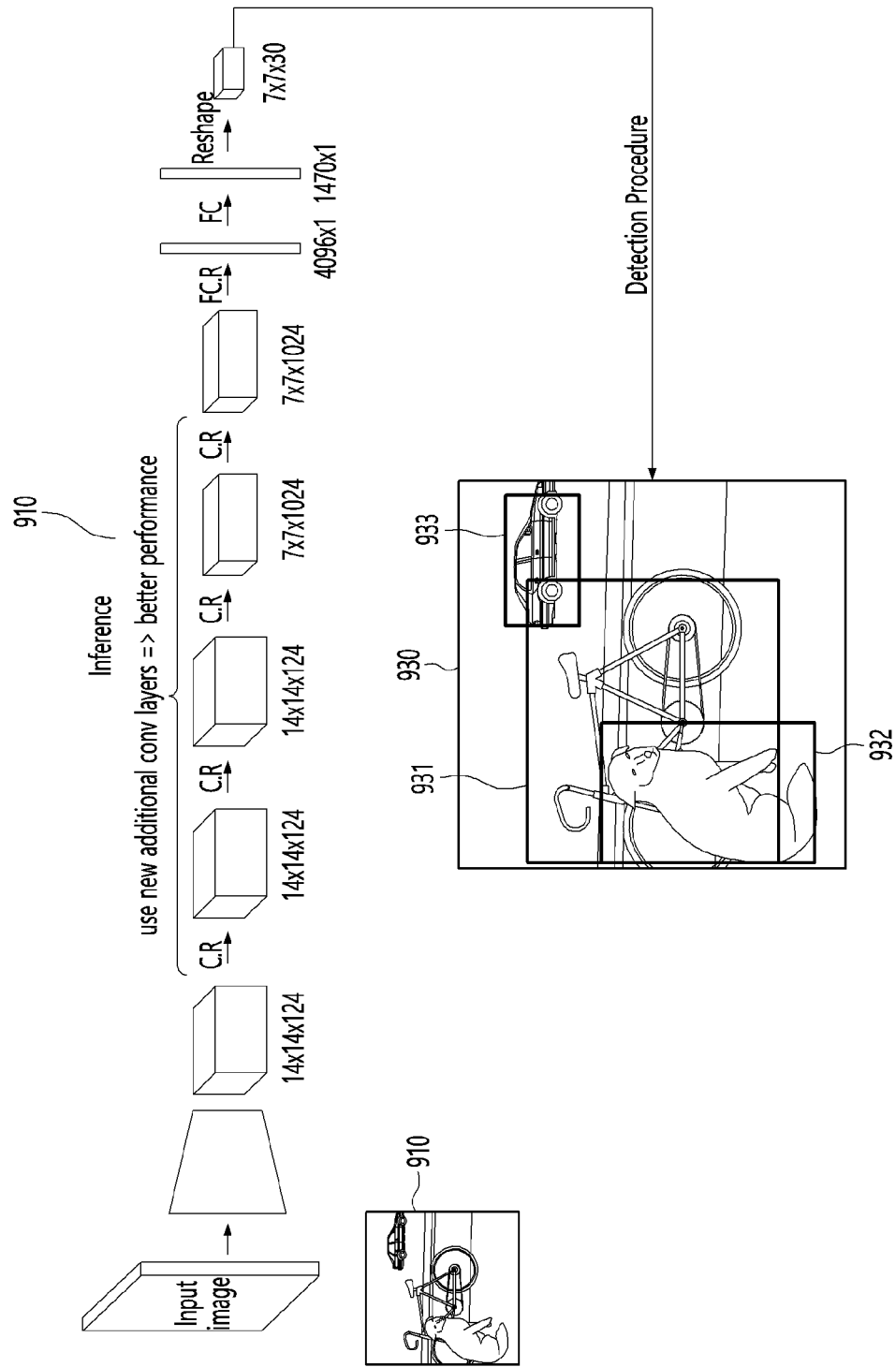
FIG. 9 illustrates a screen recognition model using an artificial neural network.

FIG. 9 is a diagram illustrating a screen recognition model using an artificial neural network.

For example, referring to FIG. 9, when the screen image data 910 is input to the screen recognition model 920 including the artificial neural network model, the coordinates of the object may be listed up and output through the preprocessing and the object detection process.

More specifically, bicycle coordinates 931, dog coordinates 931, and car coordinates 933, which are objects included in the screen image data 910, may be detected by the screen recognition model.

The screen recognition model may extract the content area 930 by aggregating outer coordinates of the detected objects.

Hereinafter, another example will be described with reference to FIG. 10.

Figure 10:
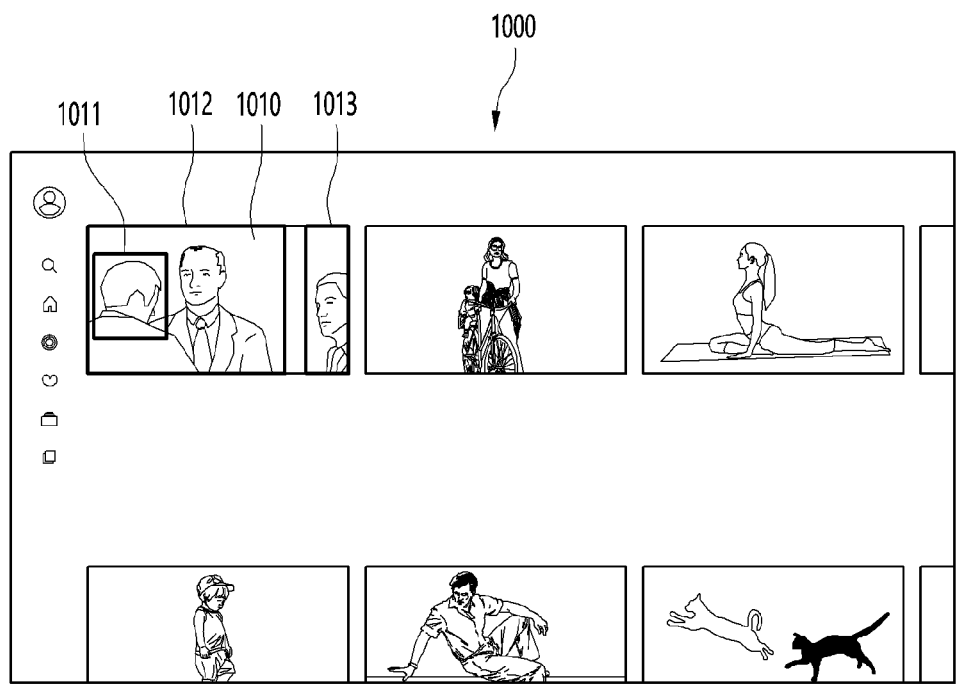
FIG. 10 illustrates an example of content area detection according to an embodiment of the present disclosure.

FIG. 10 is a diagram illustrating a process of extracting a content area for first content according to an embodiment of the present disclosure.

For example, a process of detecting first content 1010 among a plurality of contents displayed in the screen image data will be described.

When acquiring the screen image data 1000, the controller 170 may detect an object using the trained artificial neural network model and acquire coordinate data of the detected object.

Specifically, all coordinates extracted from an artificial neural network, such as an object, may be listed up using an object detection algorithm by using an artificial neural network.

The controller may determine that the overlapped objects 10, 1012, 1013 are in one grid, aggregate the overlapped or included regions, and generate one candidate.

In this case, an algorithm for aggregating overlapping areas may use an intersection of union (IOU) and a non-maximum suppression (NMS).

Figure 11:
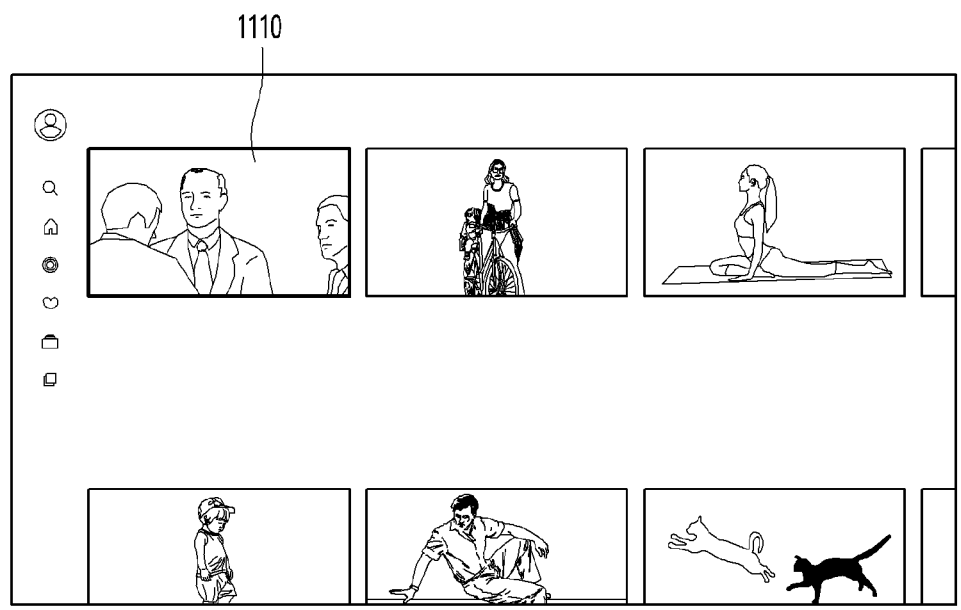
FIG. 11 illustrates a detected content area according to an embodiment of the present disclosure.

The content area 1110 shown in FIG. 11 may be detected using the above-described method.

According to an embodiment of the present disclosure, it is also possible to derive a candidate area by summing candidate coordinates of a machine learning-based method and candidate coordinates of a neural network method by using a screen recognition model obtained by combining screen recognition models of (1) and (2).

Specifically, referring to FIG. 6, in operation S625, first candidate data may be obtained using a screen recognition model using machine learning, second candidate data may be obtained from a screen recognition model using deep learning in operation S633, and final coordinates of the content area may be selected by aggregating (S640) the two candidates (S650).

For example, the screen recognition model may include a first screen recognition model and a second screen recognition model, the first screen recognition model may list up a contour candidate of the screen image data when screen image data is input, aggregate the candidates to detect a first content area, the second screen recognition model may include an artificial neural network, and when screen image data is input, the screen recognition model may detect a second content area located on the screen, and the controller may aggregate the first content area and the second content area to detect a content area.

When the final coordinates of the at least one content included in the content area are selected through the above-described process, the controller 170 according to an embodiment of the present disclosure may output a labeling icon corresponding to each content (S560).

Specifically, the controller 170 may output a labeling icon corresponding to each of the contents by using coordinate information of at least one content area output by the screen recognition model.

In this case, the coordinate information of the content area may include the content click coordinates and the content labeling coordinates.

Specifically, when a user command for selecting content is received, the content click coordinates may indicate coordinates to perform a click command for the corresponding content.

The content labeling coordinates may be coordinates for outputting a labeling icon for providing a guide for a word to be uttered by the user to select the corresponding content.

For example, the controller 170 may set top-left coordinates of the content area to a position in which the labeling icon is to be displayed, and the content click coordinates may select the center coordinates of the content area as the position at which the click command is to be performed.

That is, two coordinate data may be provided to a content provider to determine a location at which a click of a corresponding coordinate will occur when the user issues a specific command.

Thereafter, when the user utterance corresponding to any one of the labeling icons is received, the controller 170 may perform a click command at the center coordinates of the content area corresponding to the content click coordinate (S580), and execute the content corresponding to the labeling icon (S590).

Hereinafter, a process of determining information included in the labeling icon will be described.

Figure 12:
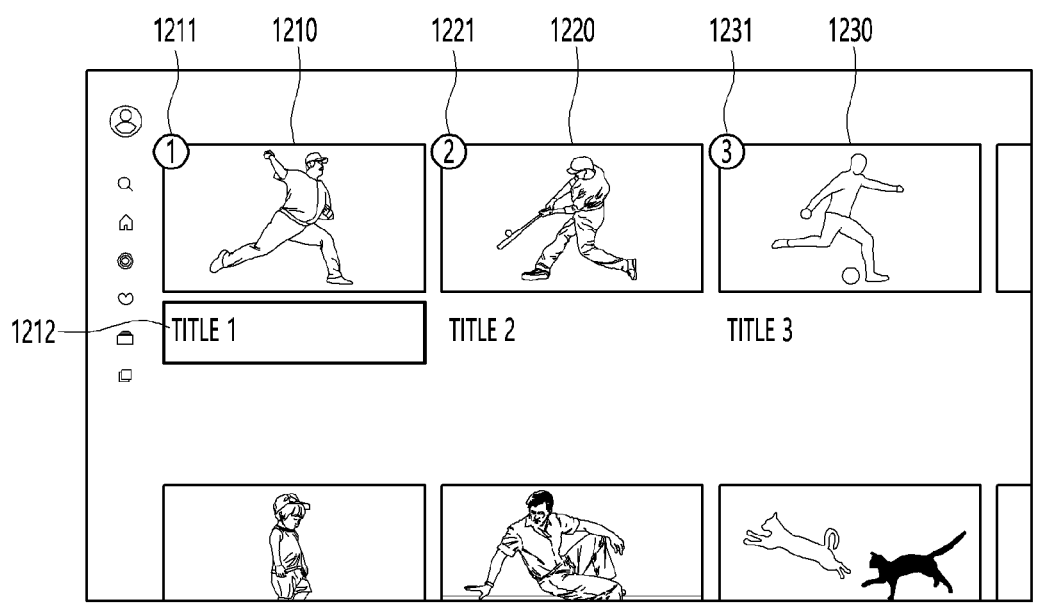
FIG. 12 illustrates an example of output of a labelling icon according to an embodiment of the present disclosure.

FIG. 12 is a view illustrating a labeling icon according to an embodiment of the present disclosure.

Referring to FIG. 12, the controller 170 according to an embodiment of the present disclosure may output a labeling icon corresponding to each of one or more content areas.

For example, a first labeling icon 1211 corresponding to a first content area 1210, a second labeling icon 1221 corresponding to a second content area 1220, and a third labeling icon 1231 corresponding to a third content area 1230 may be displayed.

The embodiment is merely an example, and the content area and the labeling icon are not limited to the configuration of FIG. 12.

In this case, the labeling icon may be an icon including at least one of object information displayed in the content area, text information displayed around the content area, and arrangement information.

The arrangement information may be arrangement information of at least one content indicated in the screen image data.

Referring to FIG. 12, the controller may display '1', '2', and '3' as labeling icons in consideration of arrangement of the plurality of labeling icons 1211, 1221, and 1231.

The arrangement information may be variously expressed as an alphabet, a Roman, a Korean consonant, and the like as well as a number.

According to an embodiment of the present disclosure, the object information displayed in the content area may be object information detected in a content area corresponding to the labeling icon.

For example, content to be displayed in the first labeling icon 1211 may be 'baseball' shown in the first content area 1210. Content to be displayed in the second labeling icon 1221 may be 'baseball player' or 'bat' shown in the second content area 1220. Content to be displayed in the third labeling icon 1231 may be 'soccer' or 'soccer player' shown in the third content area 1230.

According to an embodiment of the present disclosure, the text information displayed around the content area may be text information about an area indicating a title or information on a content area corresponding to the labeling icon.

For example, the content displayed in the first labeling icon 1211 may be disposed below the first content area 1210 and may be any one of texts displayed in a text area 1212 representing a title.

In this case, the controller may recognize the text area, perform OCR on the surrounding text, extract a representative noun from the OCR, and use the extracted representative noun as contents to be displayed in the labeling icon.

As a more specific example, the text displayed in the first labeling icon 1211 may be 'title 1'.

According to an embodiment of the present disclosure, at least one of object information displayed in the content area, text information displayed around the content area, and arrangement information may be displayed in the labeling icon, thereby providing a guide for utterance by the user.

When the user utters the content displayed in the labeling icon, it is possible to resolve a problem in which a misrecognition rate increases as utterance of speech recognition is short by proposing additional information together rather than simply indicating only a number and to more intuitively understand and utter the corresponding guide.

Hereinafter, operation S580 of receiving voice corresponding to user utterance and clicking a coordinate corresponding to content selected by the user will be described.

Figure 13:
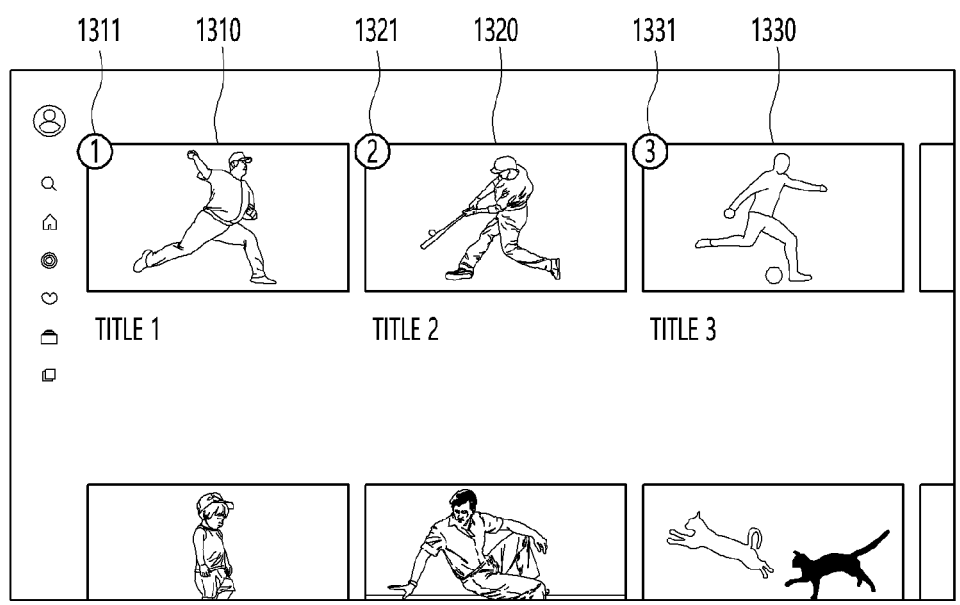
FIG. 13 is a diagram for explaining a content selection command scenario according to an embodiment of the present disclosure.

FIG. 13 is a diagram illustrating a process of selecting one of a plurality of content areas using voice recognition according to an embodiment of the present disclosure.

Referring to FIG. 13, the controller 170 may output information of labeling icons 1311, 1321, and 1331 respectively corresponding to a plurality of content areas 1310, 1320, and 1330 through the display unit 180.

As described above, the labeling icons 1311, 1321, and 1331 may provide the user with information for guiding the user utterance with respect to the corresponding content.

The user may perform utterance for selecting one of the plurality of contents.

The controller 170 may detect a content area corresponding to the corresponding labeling information by using the labeling information included in user speech recognition, and may perform an operation of clicking a central coordinate of the content area.

Specifically, the controller 170 may convert the user utterance into text information by performing a speech talk-to-text (STT) speech when speech recognition is performed by the user utterance.

The controller 170 may compare a text included in the labeling icon with text information according to the voice recognition result, and when the same or similar text exists, the controller 170 may recognize a click intention for the corresponding content area.

The controller 170 may execute a click command for the corresponding content according to whether the click intent is present.

In this case, the click command may be executed at the center coordinate of the corresponding area. Accordingly, it is possible to minimize a risk of misrecognition with respect to the content click command.

For example, when the user utters "1" after the user utters the wake-up word, the controller may recognize utterance with respect to the first labeling icon 1311 in which the information corresponding to '1' is displayed.

The controller 170 may recognize a click intention for the first content area 1310 corresponding to the first labeling icon 1311.

The controller 170 may execute a click command with respect to the center coordinate of the first content area 1310.

When the click command is executed, the first content disposed in the first content area may be reproduced.

The above description is merely an illustrative explanation of the technical idea of the present disclosure, and various modifications and variations will be possible to those skilled in the art without departing from the essential characteristics of the present disclosure.

Accordingly, the embodiments disclosed in the present disclosure are not intended to limit the technical idea of the present disclosure, but rather to explain it, and the scope of the technical idea of the present disclosure is not limited by these embodiments.

The scope of protection of the present disclosure should be interpreted in accordance with the claims below, and all technical ideas within the equivalent scope should be construed as being included in the scope of rights of the present disclosure.

What is claimed:

1. A display device comprising:
a display unit configured to output a screen provided by a content provider;
a microphone; and
a controller configured to obtain screen image data by capturing a content provider screen including at least one content output through the display unit upon receiving a wake-up word, detect at least one content area by inputting the screen image data to a screen recognition model corresponding to the content provider, output a labelling icon corresponding to each of the at least one content area using coordinate information corresponding to each of the at least one content area detected by the screen recognition model, and execute content corresponding to the labelling icon upon receiving user utterance corresponding to any one of the labelling icon.

2. The display device of claim 1, wherein the coordinate information of the content area includes a content click coordinate and a content labelling coordinate.

3. The display device of claim 2, wherein the content click coordinate is a center coordinate, and the content labelling coordinate is an upper left coordinate of the content area.

4. The display device of claim 1, wherein, based on the screen image data being input, the screen recognition model lists up a contour candidate of the screen image data, aggregates the candidates to detect a content area, and detects a content area based on the detected region.

5. The display device of claim 4, wherein the controller separates the screen image data into R, G, and B channels and inputs each of separated channel images to the screen recognition model, and
the screen recognition model detects the content area of each of the R, G, and B channels, and aggregates content areas detected for the respective channels to detect the content area.

6. The display device of claim 1, wherein the screen recognition model includes an artificial neural network, and based on the screen image data being input, the screen recognition model is learned to output the coordinate information of the content area located in the screen.

7. The display device of claim 1, wherein the screen recognition model includes a first screen recognition model and a second screen recognition model, and
based on the screen image data being input, the first screen recognition model lists up a contour candidate of the screen image data and aggregates the candidates to detect a first content area, the second screen recognition model includes an artificial neural network, and based on the screen image data being input, the screen recognition model detects a second content area located in the screen, and the controller aggregates the first content area and the second content area to detect a content area.

8. The display device of claim 1, wherein the labelling icon includes at least one of object information displayed in the content area, text information displayed around the content area, and placement information.

9. A method of operating a display device, the method comprising:

obtaining screen image data by capturing a content provider screen including at least one content output through a display unit upon receiving a wake-up word;

inputting the screen image data to a screen recognition model corresponding to the content provider;

detecting at least one content area using the screen recognition model;

obtaining coordinate information of a content area of the detected content area;

outputting a labelling icon corresponding to each of the at least one content area using the coordinate information of the content area corresponding to each of the at least one content area detected by the screen recognition model; and upon receiving user utterance corresponding to any one of the labelling icon, executing content corresponding to the labelling icon.

10. The method of claim 9, wherein the coordinate information of the content area includes a content click coordinate and a content labelling coordinate.

11. The method of claim 10, wherein the content click coordinate is a center coordinate, and the content labelling coordinate is an upper left coordinate of the content area.

12. The method of claim 9, wherein the detecting of the at least one content area using the screen recognition model includes:

based on the screen image data being input, listing up a contour candidate of the screen image data, aggregating the candidates to detect a content area, and detecting a content area based on the detected region, by the screen recognition model.

13. The method of claim 12, wherein the detecting of the at least one content area using the screen recognition model includes:

separating the screen image data into R, G, and B channels and inputting each of separated channel images to the screen recognition model; and detecting the content area of each of the R, G, and B channels, and aggregating content areas detected for the respective channels to detect the content area.

14. The method of claim 9, wherein the screen recognition model includes an artificial neural network, and based on the screen image data being input, the screen recognition model is learned to output the coordinate information of the content area located in the screen.

15. The method of claim 9, wherein the screen recognition model includes a first screen recognition model and a second screen recognition model, the detecting of the at least one content area using the screen recognition model includes:

based on the screen image data being input, listing up a contour candidate of the screen image data and aggregating the candidates to detect a first content area, by the first screen recognition model;

based on the screen image data being input, the screen recognition model detects a second content area located in the screen, the second screen recognition model including an artificial neural network, and aggregating the content area and the content area to detect a content area.

16. The method of claim 9, wherein the labelling icon includes at least one of object information displayed in the content area, text information displayed around the content area, and placement information.

* * * * *